(12) United States Patent
Lepek et al.

(10) Patent No.: US 10,396,861 B2
(45) Date of Patent: Aug. 27, 2019

(54) CIRCUIT FOR A TRANSPONDER AND METHOD FOR TESTING THE CIRCUIT

(75) Inventors: Paul Lepek, Langebrueck (DE); Detlef Dieball, Dresden (DE)

(73) Assignee: Atmel Corporation, San Jose, CA (US)

(*) Notice: Subject to any disclaimer, the term of this patent is extended or adjusted under 35 U.S.C. 154(b) by 802 days.

(21) Appl. No.: 12/766,548

(22) Filed: Apr. 23, 2010

(65) Prior Publication Data

US 2010/0281301 A1    Nov. 4, 2010

Related U.S. Application Data

(60) Provisional application No. 61/174,253, filed on Apr. 30, 2009.

(30) Foreign Application Priority Data

Apr. 30, 2009    (DE) .................. 10 2009 019 324

(51) Int. Cl.
| G01R 27/28 | (2006.01) |
| G01R 31/00 | (2006.01) |
| G01R 31/14 | (2006.01) |
| H04B 5/00 | (2006.01) |
| H04L 29/06 | (2006.01) |
| H04B 17/15 | (2015.01) |
| H04W 12/06 | (2009.01) |

(52) U.S. Cl.
CPC .......... H04B 5/0068 (2013.01); H04B 17/15 (2015.01); H04L 63/0492 (2013.01); H04B 5/0037 (2013.01); H04W 12/06 (2013.01)

(58) Field of Classification Search
CPC ................ H04B 5/0068; G01R 31/31917
USPC ..................................................... 702/117
See application file for complete search history.

(56) References Cited

U.S. PATENT DOCUMENTS

| 4,417,336 | A | * | 11/1983 | Weilbacker | ............. G06F 15/17 702/122 |
| 4,893,235 | A | * | 1/1990 | Butts, Jr. | ................. G06F 9/226 712/208 |
| 7,015,826 | B1 | * | 3/2006 | Chan et al. | ............. 340/870.17 |
| 7,181,665 | B2 | | 2/2007 | Son | |
| 8,064,356 | B1 | * | 11/2011 | Krzanowski | ............ H04L 41/04 370/249 |

(Continued)

FOREIGN PATENT DOCUMENTS

| DE | 101 11 266 C1 | 4/2002 |
| DE | 10 2004 043 408 A1 | 4/2005 |
| DE | 602 13 320 T2 | 8/2007 |

OTHER PUBLICATIONS

Definition of Electronic Product Code, printed on Sep. 22, 2017.*

(Continued)

*Primary Examiner* — Michael P Nghiem
(74) *Attorney, Agent, or Firm* — Fish & Richardson P.C.

(57) ABSTRACT

A method for testing a circuit for a transponder, and transponder circuit, is provided, in which the circuit is operated in a passive mode in that the circuit is supplied with energy from a field, in which, during the passive mode, the circuit receives a command via the field to activate a test routine, in which memory content is stored by the test routine as test data in a memory area of a memory of the circuit predetermined by the test routine, in which, during the passive mode, the test data are transmitted via the field.

15 Claims, 2 Drawing Sheets

(56) References Cited

U.S. PATENT DOCUMENTS

| | | | |
|---|---|---|---|
| 2002/0170975 A1 | 11/2002 | Kawano et al. | |
| 2002/0194541 A1 | 12/2002 | Otterbach et al. | |
| 2005/0240370 A1* | 10/2005 | Diorio et al. | 702/107 |
| 2007/0236336 A1* | 10/2007 | Borcherding | 340/10.34 |
| 2007/0243901 A1 | 10/2007 | Cho | |
| 2009/0045832 A1* | 2/2009 | Brandi et al. | 324/763 |
| 2009/0303049 A1* | 12/2009 | Greenlee et al. | 340/572.3 |
| 2009/0322372 A1* | 12/2009 | Stenzel | 324/767 |
| 2010/0023294 A1* | 1/2010 | Fan | G01R 31/2834 702/123 |
| 2010/0204950 A1* | 8/2010 | Flores et al. | 702/123 |

OTHER PUBLICATIONS

Chinese Patent Office, Text of the First Office Action, Chinese Patent Application No. 201010163945.7, dated Jul. 3, 2012 and transmitted to Baker Botts L.L.P. on Sep. 12, 2012, 7 pages. (with translation), dated Sep. 21, 2012.

\* cited by examiner

CIRCUIT FOR A TRANSPONDER AND METHOD FOR TESTING THE CIRCUIT

This nonprovisional application claims priority to German Patent Application No. DE 10 2009 019 324.3, which was filed in Germany on Apr. 30, 2009, and to U.S. Provisional Application No. 61/174,253, which was filed on Apr. 30, 2009, and which are both herein incorporated by reference.

BACKGROUND OF THE INVENTION

Field of the Invention

The present invention relates to a circuit for a transponder and a method for testing a circuit for a transponder.

Description of the Background Art

From U.S. Pat. No. 7,181,665 B2 is known a device for testing a smart card and a method for testing a smart card. The device for testing has a logic tester, a contactless interface, and a contact interface. The logic tester generates a test pattern, which is transmitted to the smart card to test the smart card. The device receives a response pattern to test the status of the smart card. The contactless interface makes a contactless test mode possible. In contrast, the contact interface makes a contact test mode possible.

SUMMARY OF THE INVENTION

It is therefore an object of the invention to improve a method for testing a circuit for a transponder to the greatest extent possible. Accordingly, a method for testing a circuit for a transponder is provided. During testing, the circuit can be operated in a passive mode. In the passive mode, the circuit is supplied with energy solely from a field. The field is preferably an alternating magnetic field or an electromagnetic field.

During the passive mode, the circuit receives a command from a base station by the field to activate a test routine. This command can be password-protected, so that the test routine is only executed upon entry of a correct password. It is possible for the test routine to be permanently or programmably implemented in the program memory of the transponder. The test routine can also be referred to as a debug routine.

A normal program sequence in the circuit of the transponder is interrupted in order to start the test routine. A memory content is read out by the test routine. The memory content is preferably hidden in the normal program sequence and thus cannot be read out through the protocol layer. Such masked memory content can be stored in a status register and/or an input/output register, for example. Preferably the memory content of a status register and/or input/output register is read out in the test routine.

The memory content can be stored as test data in a memory area of a memory of the circuit predetermined by the test routine. The memory is an SRAM memory of the circuit, for example. For storage, the memory content can advantageously be copied and/or compressed and/or encoded and/or encrypted.

During the passive mode, the test data are transmitted to the base station by means of the field. For this purpose, the test data can be transmitted as payload data in a time interval predetermined for transmission.

The invention has the additional object of specifying a circuit for a transponder that is improved to the greatest degree possible. Accordingly, a circuit for a transponder is provided. The circuit can have an interface for communication by means of a field. The circuit has a processor unit connected to the interface. The processor unit is, for example, a processor core as a component of a microcontroller. The circuit has a memory connected to the processor unit.

In a passive mode, the processor unit is supplied with energy from the field. In this context, the energy from the field is converted to electrical energy and is temporarily stored in a capacitor.

The interface and the processor unit are configured to receive, when in passive mode, a command for activating a test routine (debug routine) from a base station by means of the field.

The processor unit is configured to store, by means of the test routine, memory content as test data (debug data) in a memory area of the memory predetermined by the test routine. The circuit can have a plurality of registers, wherein the memory content can be read out from a register by means of the test routine.

The interface and the processor unit can be configured to transmit the test data to the base station by means of the field in passive mode.

The embodiments described below relate equally to the circuit and to the method for testing the circuit of the transponder. Functional features of the circuit are evident from method steps here.

According to an embodiment, data interfaces of the circuit are deactivated with the exception of the interface for transmitting and receiving by means of the field. In particular, terminals (pins) of the circuit are disconnected or turned off for deactivation.

According to an embodiment, provision is made that the test routine is programmed during a first communication. To this end, code of the test routine is transmitted from the base station to the circuit of the transponder, for example. In this context, the point in the normal program sequence at which it is possible to branch off to the test routine can be determined by the programming. Furthermore, the memory area for storing the test data is preferably determined by the programming. After the programming of the program routine, the programmed test routine is activated in a second communication, in particular following the first communication.

According to an embodiment, provision is made that the predetermined memory area for storing the test data, in particular its size and/or position within the memory, is changed or programmed by changing the test routine. Thus it is possible, for example, after a successful test to release the memory reserved for the test data for normal operation, for example as working memory.

In another embodiment, provision is made for test data to be stored with an identifier associated with one or more test routines. The identifier is, for example, a session number that is stored with the associated test data for each sequential test block (session) of the transponder circuit, so that the test data can be associated with the applicable session. For example, the sessions may be carried out under different boundary conditions, such as different distances between transponder and base station.

In further embodiments, the circuit can be operated with a clock signal from an internal clock generator of the circuit. The internal clock generator maintains a clock frequency during the test routine so that the test takes place with the same circuit power consumption as in normal operation. Alternatively, the circuit is operated with a clock signal derived from a carrier signal of the field to execute the test routine. For example, the clock signal is derived by frequency division of the carrier frequency of the carrier signal.

According to an embodiment, within a communication protocol of the passive mode between a base station connected by the field and the circuit of the transponder, a time slot is agreed upon for transmission of the test data from the transponder circuit to the base station.

In a passive mode the base station transmits a command to the transponder circuit to transmit the test data. The transponder circuit does not transmit the requested data to the base station until after receiving the command to transmit.

In an embodiment, provision is made that the test data are encrypted and/or compressed and/or encoded for storage.

In another embodiment, which can also be used in combination, an authentication is carried out by the transponder circuit for activation of the test routine.

The embodiments described above are particularly advantageous both individually and in combination. In this regard, all variant refinements may be combined with one another. Some possible combinations are explained in the description of the exemplary embodiments from the figures. However, these possible ways presented there of combining the variant refinements are not exhaustive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
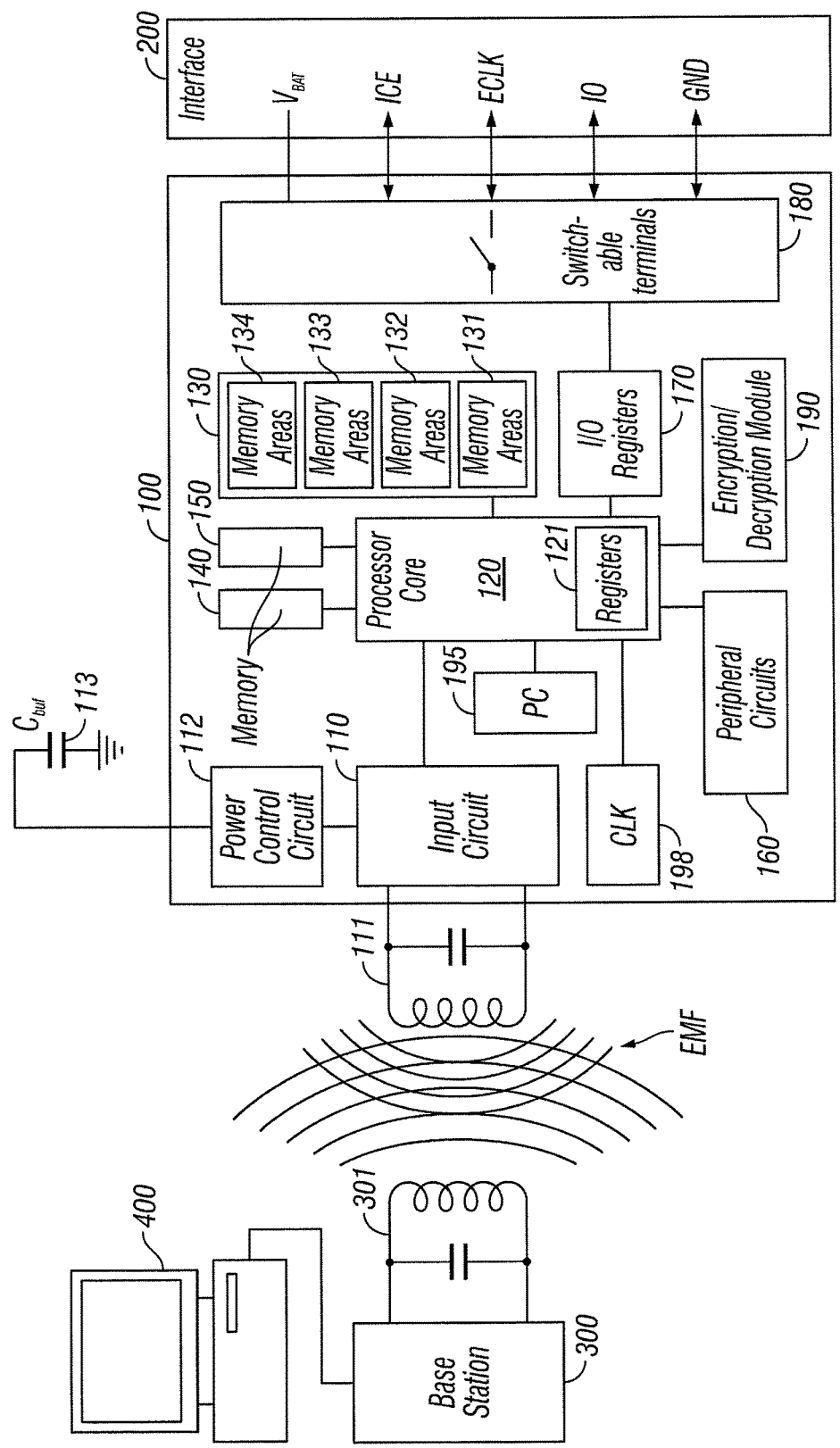
FIG. 1 is a schematic block diagram of a circuit for a transponder.

Schematically shown in FIG. 1 is a system with a transponder and a base station 300. The system consists of a contactless, passive transponder and a base station 300, which establish a wireless communication connection as communication partners, wherein an authorization takes place between the transponder and base station 300, so that the base station 300 is the exclusive communication partner of the transponder. Here, information is exchanged between the two through a communications channel using the half-duplex method over a contactless interface. The base station 300 can also be called the query unit.

For the purposes of testing a circuit 100 of the transponder, the base station 300 is connected to a computer 400, an input terminal, or the like by a connection. In contrast, the base station 300 is connected to the transponder only by a field EMF. The field EMF is, for example, a magnetic or electromagnetic field, which permits wireless transmission of data between the base station 300 and the circuit 100 of the transponder.

Accordingly, the base station 300 supplies the transponder with energy via the field EMF. In addition, the base station 300 acts as master and generates protocols and messages for communication with the transponder. The base station 300 sends commands, which typically are requests in an application protocol layer, for example to read, to encrypt, or to return data from the transponder to the base station 300. The individual actions then take place in a defined sequence and/or priority.

In the exemplary embodiment in FIG. 1, the base station 300 has a resonant circuit 301 for transmitting the field EMF. The circuit 100 likewise has a resonant circuit 111, which in the exemplary embodiment in FIG. 1 has a resonant frequency tuned to the resonant circuit 301 of the base station 300. The base station 300 can transmit data to the circuit 100 of the transponder, for example by means of amplitude modulation. Return transmission of data from the circuit 100 of the transponder to the base station 300 is likewise possible. For example, the return transmission takes place through modulated damping of the field EMF or alternatively by return transmission of a modulated signal at a different frequency.

The resonant circuit 111 of the circuit 100 of the transponder is connected to an analog input circuit 110. The analog input circuit 110, together with the resonant circuit 111, is designed to extract electrical energy from the field EMF. This electrical energy is temporarily stored as charge in a capacitor 113, Cbuf by means of a power control circuit 112, and is made available by means of the power control circuit 112 to the remaining circuit components of the circuit 100 of the transponder for carrying out functions.

In a passive mode, the circuit 100 of the transponder is supplied with energy solely from the field EMF here. As long as the field EMF is received adequately, the circuit 100 can thus execute routines. The field EMF causes an induced voltage that, when rectified, temporarily stored, and regulated, serves as the supply voltage for the circuit 100. Even though the circuit 100 of the transponder in the exemplary embodiment from FIG. 1 has a number of terminals, they must be deactivated in the passive mode in order to minimize power consumption of the circuit.

However, if the energy from the field is no longer sufficient, routines of the circuit 100 that have started are aborted or terminated. In this regard transponders can be designed as purely passive transponders, which can be operated only in the presence of sufficient energy supply from the field. Other types of transponders additionally have a battery, and can be switched between a passive mode and a battery-backed mode.

An optional interface 200 to a battery voltage Vbat is schematically represented in FIG. 1. In a purely passive transponder, this interface 200 to the battery voltage Vbat is not connected or is omitted entirely.

The circuit 100 of the transponder in FIG. 1 has a processor core 120 as the processor unit, which is connected to the analog input circuit 110 for transmitting and receiving data by means of the field EMF. The processor core 120 here is part of a microcontroller (MCU) with programmable program memory (140) and data memory (130). The processor core 120 of the microcontroller is configured and connected to read and write data in the internal memory 130 and to read the program code from the program memory 140 and execute program code from program routines. The at least partly analog input circuit 110 acts as an interface 110 for communication through the field EMF in this arrangement. The connection between base station 300 and circuit 100 of the transponder is contactless in this arrangement.

The processor core 120 is configured to execute routines. To this end, the processor core 120 is connected to a preferably programmable program memory 140 for storing the commands from the routines. Both program routines and test routines are stored in the program memory 140 here. The test routines are also called debug routines in this context. At least the test routines are preferably capable of being changed through programming here.

Figure 2:
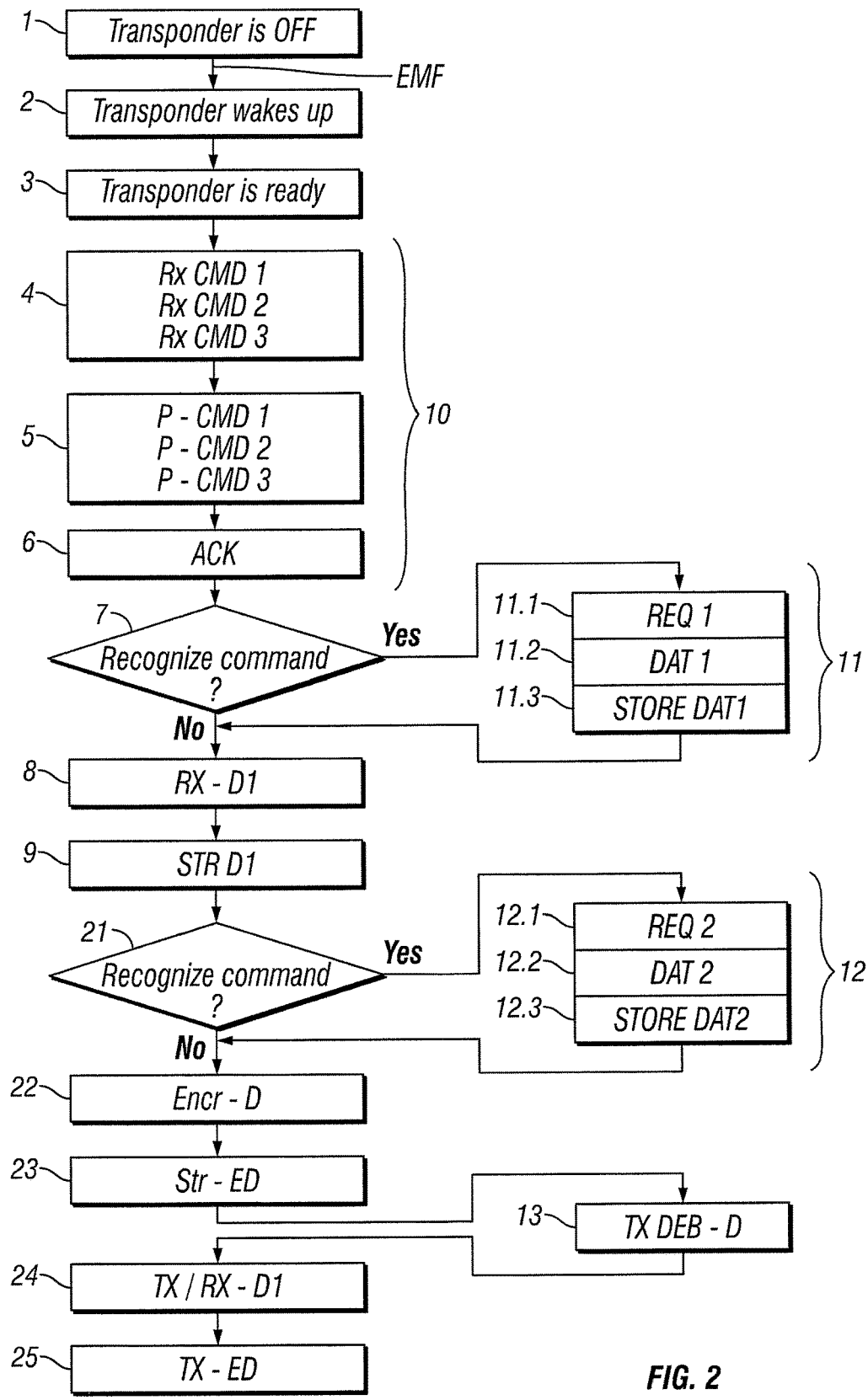
FIG. 2 is a schematic flow diagram of a program of the transponder.

The processor core 120 is also connected to a memory 130, which in the exemplary embodiment from FIG. 2 is designed as a static volatile memory SRAM. This memory 130 has multiple memory areas 131, 132, 133, 134 defined by the routines. Furthermore, the processor core 120 is connected to input/output registers 170, which allow the input or output of analog or digital data through switchable terminals (I/O ports) 180. For example, the circuit 100 of the transponder has hard-wired interfaces 200 to a battery voltage Vbat, to an external emulator ICE, to an external clock signal ECLK, to digital interfaces, for example serial or parallel interfaces IO, or to supply voltage terminals GND. All interfaces 200 are turned off in the passive mode in order to minimize power consumption. Consequently, testing of the circuit 100 through the interface of the emulator ICE is not possible in passive mode.

In addition to the input/output registers 170, the processor core 120 can also have registers, such as status registers 121. The processor core 120 is additionally connected to an internal clock generator 198 for outputting an internal clock signal CLK. In order to output a program address PC, the processor core 120 is connected to an internal program counter 195. Moreover, a connection between the processor core 120 and peripheral circuits 160, such as a timer or the like, may also be provided. The peripheral circuits 160 are configured for fully asynchronous data processing here. Asynchronous data processing is needed for the reception, decoding, and encoding of serial asynchronous signals in the receiving case and/or in the transmitting case.

In the passive mode, the processor unit 120 is supplied with energy solely from the field EMF. The interface 110 and the processor unit 120 make it possible for a command to activate a test routine, which can also be called a debug routine, to be received in the passive mode by means of the field EMF. To this end, the program routine stored in the program memory must provide the opportunity to evaluate the command to activate the test routine.

The processor unit 120 is configured to define a predetermined memory area 133 of the memory 130 by means of the test routine. In the exemplary embodiment from FIG. 2, the memory 130 has a first memory area 131 as registers, a second memory area 132 for application-specific data, a third memory area for test data obtained by means of the test routine, and a fourth memory area 134 as a stack.

The processor unit is configured by the stored test routine to store selectable memory content as test data in the memory area 133 of the memory 130 predetermined by the test routine. During the normal program sequence of the program routines, this memory content cannot be read out. Particularly the hidden memory contents of registers, such as the contents of the input/output register 170 and/or the status register 121, should be read by means of test routines. In addition, variables which cannot be read out in the normal program routine may be stored as test data.

The test data are temporarily stored in the predetermined memory area 133 in order to send them to the base station 300 with a later transmission. For transmission to the base station 300, the interface 110 and the processor unit 120 should be configured to send the test data to the base station in passive mode by means of the field EMF. If a memory 133 of the volatile memory 130 is used for storage, the test data could be lost in the event of a drop in the energy supply through the field EMF. Alternatively, the test data may be stored in a nonvolatile memory 150 (EEPROM, flash) of the circuit 100 in order to avoid a loss of the test data.

In addition, the circuit 100 has an encryption/decryption module 190 for decrypting and/or encrypting, in particular, security-relevant data in the memories (121, 130, 140, 150, 170) of the transponder.

Shown in FIG. 2 is a process flow in the form of a schematic flow diagram. The process flow preferably takes place in a microcontroller of a transponder set up for the purpose. To this end, the transponder and a base station constitute a system for communication.

In the first process step, the transponder is in a switched-off state in that it is not supplied with energy by a field. Next, a base station begins to generate an electromagnetic field EMF that reaches the transponder.

In the second process step, a circuit of the transponder with the microcontroller wakes up and then executes an initialization, so that in step 3 the transponder is ready for communication.

In order to test the circuit of the transponder, it is a prerequisite that the circuit be operated in a passive mode. In the passive mode, the circuit of the transponder is supplied with energy from the field EMF starting with process step 2.

The routine 10 comprises multiple process steps 4, 5 and 6. In process step 4, a number of commands CMD1, CMD2, CMD3 for activating later test routines 11, 12 are received by the circuit in the passive mode by means of the field EMF. If the commands CMD1, CMD2, CMD3 are not received, the test routines 11, 12 remain deactivated and communication takes place between the base station and the transponder without specific testing of the circuit of the transponder. The software implemented in the transponder is configured to identify the received commands and recognize test-specific requests from the base station.

In step 5, the commands are recognized (parsed) from the received data, and in step 6 an acknowledgement ACK is transmitted back to the base station.

In order to be able to deviate from the normal process sequence for the test routines 11, 12, a branch that permits starting of a test routine 11, 12 must be provided in the general program sequence. To start a test routine 11, 12, a dynamic branch instruction may be used, for example. To this end, a branch address pointing to a test routine 11 is loaded into a branch register by means of a recognized command CMD1. It is schematically shown in step 7 that in the case of the present branch address for process step 11.1, branching takes place to the test routine 11. In contrast, if the command CMD1 is absent, the address associated with step 8 of the normal program sequence is loaded into the branch register, for example. Alternatively, for the purpose of branching from the normal program sequence in step 7 it is also possible for a variable to be evaluated that is set or reset by means of the command CMD1.

In step 11.1, the request REQ1 from the base station is evaluated. As a function thereof, the circuit of the transponder can load its current status into a memory belonging to the circuit in the test routine 11. The request from the base station is preferably checked in accordance with an authorization profile and the requesting user. Thus, different test routines can be enabled or locked in a user-dependent manner.

In step 11.2, memory content DAT1—which cannot be read out in the normal program sequence is read as test data, depending on the preceding request, and step 11.3 is stored by the test routine 11 in a predetermined memory area of a memory of the circuit until the base station requests a transmission to the base station. In this context, it is possible to erase the memory area for the test data with each new command to activate the test routine and to store the test data on a session basis. It is likewise possible, by means of control from the base station, to store the test data with a session number as identifier and to transmit test data from multiple sessions together with the applicable identifiers for the sessions to the base station during one return transmission to the base station. If it is possible that an interruption of the energy supply through the field EMF can occur between sessions, then the test data may be stored with the identifier in a non-volatile memory (EEPROM).

In step 8, data are received by the transponder, and in step 9 they are stored. For example, the transponder checks by means of the data received in step 8 whether the transponder is associated with the querying base station, and whether the base station is thus authorized to establish a communication connection with the transponder.

In step 21 another branch within the program routine is provided to another test routine 12. The condition of the branch is defined, for example, by a second command CMD2, CMD3 received in step 4, for example in that a branch address is again loaded into a branch register that is queried at this point in the program routine. In the event of the test, the process is continued with the steps 12.1, 12.2, and 12.3 of the test routine, which has a design corresponding to that of the test routine 11 by way of example. In this context, memory contents are stored as test data DAT2, DAT3 in either the registers that were previously read and/or different registers in the predetermined memory area. For the purpose of storing the test data DAT2, DAT3, in the simplest case they may be copied. It is likewise possible to encode, to encrypt, and/or to compress the test data DAT2, DAT3 for storage.

An encryption of data takes place in step 22, wherein the encrypted data are stored in step 23. For encryption, a 128-bit AES algorithm may be used, for example.

In step 13, the stored test data are transmitted back to the base station by means of the field EMF during the passive mode. Further evaluation can then take place with a computer. A communications protocol that supports an exchange of data between the base station and the transponder is defined in this context such that time delay intervals are provided within the communication in which are provided time slots of variable length. The test data are transmitted during a return transmission from the transponder to the base station (from client to host) within these reserved time slots within the normal communication between the base station and the transponder. The time delay intervals are restricted to a predetermined length here, so that they do not interfere with the standard-conformant communication between base station and transponder.

By means of the process explained above, the surprising effect is achieved that a contactless testing of the program sequence in the transponder is possible at almost any desired point in the program code. Moreover, the surprising effect is achieved that the transponder can be tested fully with regard to its hardware and software even under the difficult boundary conditions of the passive mode, without the boundary conditions of the test imposed by the field being changed—for example by an additional voltage supply of the transponder. Furthermore, the advantage is achieved that it is not necessary to lead out the terminal pins of the hardware for a later test, so that the transponder can be completely encapsulated without pins, and is tested entirely through the field.

The invention is not restricted to the variant embodiments shown in FIGS. 1 through 2. For example, it is possible to provide the branching to the test routine at any desired point in the program sequence by programming the program code. It is also possible to provide more complex test routines with processing of the tested memory contents. Preferably the test routines are designed to be programmable. The test routines can be programmed prior to a test in the transponder, for example. After testing is completed, they can be removed completely or entirely from the transponder's program memory. In addition to testing by means of the field, a test interface may be provided that is provided for battery-backed testing. This allows a two-stage test, in that the basic functions are initially tested in a first stage through the wired interface, and then in a second stage testing takes place wirelessly in passive mode exclusively under the conditions of the field. The functionality of the circuit from FIG. 1 can be used to particular advantage for a purely passive, which is to say batteryless, transponder.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for testing a circuit for a transponder, the method comprising:
   operating the circuit in a passive mode such that a first interface of the circuit is supplied with energy from a field, wherein at least one switchable terminal comprising a second interface of the circuit is deactivated while energy from the field is supplied via the first interface;
   receiving, via the field, a command by the circuit during the passive mode, the command configured to activate a test routine code, the command causing a branch address pointing to the test routine code to be loaded in a branch register to activate the test routine code;
   responsive to the branch address, activating the test routine code;
   storing a first test data, generated by the test routine code, and a first session number identifying the first test data, in a memory area of a memory of the circuit, the memory area being predetermined by the test routine code;
   storing a second test data, generated by the test routine code, and a second session number identifying the second test data, in the memory area; and
   after receiving a subsequent request for the first and second test data, transmitting during the passive mode the first test data and the first session number, together with the second test data and the second session number, during one return transmission via the field.

2. The method according to claim 1, wherein the test routine code is received during a first communication, and wherein the test routine code is activated in a second communication thereafter.

3. The method according to claim 1, wherein the predetermined memory area for storing the first and second test data is changed or programmed by changing the test routine code.

4. The method according to claim 1, wherein the circuit is operated with a clock signal from an internal clock generator of the circuit or with a clock signal derived from a carrier signal of the field to execute the test routine code.

5. The method according to claim 1, wherein, within a communication protocol between a base station connectable by the field and the circuit of the transponder, a time slot is agreed upon for transmission of the first and second test data and the first and second session numbers from the circuit of the transponder to the base station.

6. The method according to claim 1, wherein the first and second test data are encrypted for storage.

7. The method according to claim 1, wherein an authentication is carried out by the circuit of the transponder for activation of the test routine code.

8. A method for testing a circuit for a transponder, the method comprising:
operating the circuit in a passive mode such that the circuit is supplied with energy from a field;
receiving a command by the circuit during the passive mode, via the field to activate a test routine code, the command causing a branch address pointing to the test routine code to be loaded in a branch register to activate the test routine code;
storing a first test data, generated by the test routine code, and a first session number identifying the first test data, in a memory area of a memory of the circuit, the memory area being predetermined by the test routine code;
storing a second test data, generated by the test routine code, and a second session number identifying the second test data, in the memory area;
responsive to the branch address, activating the test routine code; and
transmitting during the passive mode the first test data and the first session number, together with the second test data and the second session number, during one return transmission via the field,
wherein, within a communication protocol between a base station connectable by the field and the circuit of the transponder, a reserved time slot is agreed upon for transmission of the first and second test data and the first and second session numbers from the circuit of the transponder to the base station,
wherein the circuit of the transponder transmits the first and second test data and the first and second session numbers to the base station during the reserved time slot that was agreed upon.

9. A circuit for a transponder, the circuit comprising:
a first interface configured to communicate via a field;
at least one switchable terminal comprising a second interface of the circuit;
a processor unit connectable to the first interface; and
a memory connectable to the processor unit,
wherein the processor unit, in a passive mode, is supplied with energy from the field,
wherein the first interface and the processor unit are configured to receive via the field, when in passive mode, a command to activate test routine code, the command causing a branch address pointing to the test routine code to be loaded in a branch register,
wherein the processing unit is configured by the branch register to activate the test routine code,
wherein the processor unit is configured to store a first test data, generated by the test routine, and a first session number identifying the first test data, in a memory area of the memory predetermined by the test routine and to store a second test data, generated by the test routine, and a second session number identifying the second test data, in the memory area; and
wherein the first interface and the processor unit are configured to transmit the first test data and the first session number, together with the second test data and the second session number, during one return transmission via the field when in the passive mode after receiving a subsequent request for the first and second test data,
wherein, during the passive mode, the at least one switchable terminal of the circuit is deactivated while energy from the field is supplied via the first interface.

10. The circuit according to claim 9, wherein the processor unit is configured to:
store the test routine code in response to a first communication that is received; and
activate the test routine code in response to a second communication that is received after the first communication.

11. The circuit according to claim 9, wherein the memory area that is for storing the first and second test data is changed or programmed by changing the test routine code.

12. The circuit according to claim 9, wherein the circuit is operated with a clock signal from an internal clock generator of the circuit or with a clock signal derived from a carrier signal of the field to execute the test routine.

13. The circuit according to claim 9, wherein the first and second test data are encrypted for storage.

14. The circuit according to claim 9, wherein an authentication is carried out by the circuit of the transponder for activation of the test routine code.

15. A circuit for a transponder, the circuit comprising:
an interface configured to communicate via a field;
a processor unit connectable to the interface; and
a memory connectable to the processor unit,
wherein the processor unit, in a passive mode, is supplied with energy from the field,
wherein the interface and the processor unit are configured to receive via the field, when in passive mode, a command to activate a test routine code, the command causing a branch address pointing to the test routine code to be loaded in a branch register,
wherein in response to the branch address the processing unit is configured to activate the test routine code,
wherein the interface and the processor unit are configured to transmit a first test data generated by the activated test routine, and a first session number identifying the first test data, via the field when in the passive mode,
wherein the interface and the processor unit are configured to transmit a second test data generated by the activated test routine, and a second session number identifying the second test data, via the field when in the passive mode,
wherein, within a communication protocol between a base station connectable by the field and the circuit of the transponder, a reserved time slot is agreed upon for transmission of the first test data and the first session number, together with the second test data and the second session number, from the circuit of the transponder to the base station, and wherein the interface and the processor unit are configured to transmit the first and second test data and the first and second session numbers, during one return transmission during the reserved time slot that was agreed upon.

\* \* \* \* \*

UNITED STATES PATENT AND TRADEMARK OFFICE
CERTIFICATE OF CORRECTION

PATENT NO.       : 10,396,861 B2
APPLICATION NO.  : 12/766548
DATED            : August 27, 2019
INVENTOR(S)      : Paul Lepek and Detlef Dieball Page 1 of 1

It is certified that error appears in the above-identified patent and that said Letters Patent is hereby corrected as shown below:

In the Specification

Column 7, Line 2, replace "sequence" with --sequence- --;

Column 7, Line 3, after "and" insert --in--; and

In the Claims

Column 9, Line 21, Claim 8, replace "field" with --field,--.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*